(12) United States Patent
Yip

(10) Patent No.: US 6,859,618 B1
(45) Date of Patent: Feb. 22, 2005

(54) EXPOSURE COMPENSATION METHOD AND SYSTEM EMPLOYING METER MATRIX AND FLASH

(75) Inventor: Thomas W. Yip, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/714,301

(22) Filed: Nov. 15, 2003

(51) Int. Cl.[7] .............................................. G03B 15/03
(52) U.S. Cl. ...................... 396/61; 396/121; 396/165; 396/234
(58) Field of Search .................. 396/61, 100, 121–123, 396/165, 233, 234; 348/370.1, 371

(56) References Cited

U.S. PATENT DOCUMENTS

| | | | | |
|---|---|---|---|---|
| 4,664,495 A | * | 5/1987 | Alyfuku et al. .............. | 396/234 |
| 4,941,009 A | * | 7/1990 | Yoshida ....................... | 396/121 |
| 5,963,254 A | | 10/1999 | Kim et al. | |
| 6,240,253 B1 | * | 5/2001 | Yamaguchi et al. .......... | 396/61 |
| 6,389,232 B2 | | 5/2002 | Ishihara et al. | |
| 6,516,147 B2 | * | 2/2003 | Whiteside .................... | 396/61 |

* cited by examiner

*Primary Examiner*—W. B. Perkey

(57) ABSTRACT

Mechanisms for compensating for backlight conditions in a scene for use in an image capture device that includes a flash and a flash control signal for activating the flash when the flash control signal is asserted are described. First, a meter matrix for a scene that includes a plurality of points, where each point can include brightness information and distance information, is generated. Second, a flash control signal is selectively asserted based on the meter matrix.

16 Claims, 5 Drawing Sheets

EXPOSURE COMPENSATION METHOD AND SYSTEM EMPLOYING METER MATRIX AND FLASH

FIELD OF THE INVENTION

The present invention relates generally to photography, and more particularly, to an exposure compensation method and system employing meter matrix and flash.

BACKGROUND OF THE INVENTION

Light meters are commonly used in cameras to determine whether there is sufficient light in the scene to produce a properly exposed image. When there is insufficient light in the scene, the camera may utilize a flash to aid in the exposure of the scene. A common feature in cameras is automatic flash. When the light meter indicates that the amount of light in the scene, which is typically an average brightness in the scene, is below a threshold brightness level, an automatic flash circuit initiates the flash. Unfortunately, there are instances when the average brightness in the scene is sufficiently above the threshold because of a bright background, but the subject is dimly lit. This type of exposure is commonly referred to as a back light exposure.

When photographing a dimly lit subject in a scene with a surrounding illumination condition, such as the sun, an incandescent light, or the headlights of, cars at night, the subject is placed in a backlight illumination state. The resulting image of the subject will be under-exposed.

That is, when photographing a backlit subject without backlight compensation, the exposure will be controlled in accordance with the overall luminance of the scene without any allowance for the luminance level of the object, thereby producing an underexposed image of the subject. To compensate for this situation, the camera is provided with backlight compensation.

Some cameras have a backlight compensation feature that is manually set by a user and other cameras have an automatic backlight compensation feature that automatically detects backlight conditions and automatically adjusts the iris to improve the resulting image. Unfortunately, both the manual and automatic backlight compensation offer only tolerable results.

U.S. Pat. No. 5,963,254 describes a prior art backlight compensation technique that performs automatic backlight compensation without need for manually re-designating a backlight compensation area, despite changes in ambient illumination, by selecting the most appropriate backlight compensation area for changes in the ambient illumination and the movement of an object from among a plurality of predetermined backlight compensation areas. Backlight compensation is performed by adjusting the positions and sizes of backlight compensation areas so as to be suitable to the surroundings of the monitoring camera by a user, and automatically or manually selecting the most appropriate backlight compensation area in accordance with changes in illumination and changes in the position of the object, and controlling the iris according to the luminance level of the selected backlight compensation area.

One disadvantage of this approach is that the use of an iris driver and an iris driving signal generator, along with associated adjustment hardware, complicates camera design and raises reliability issues. However, the subject could still need to be illuminated by flash, even if the iris has been adjusted to compensate for back lighting.

U.S. Pat. No. 6,389,232 describes another prior art exposure control technique. This exposure control method and apparatus for a camera has a two-area divided brightness measurement system. A central light value is determined based on a central area brightness of a photographic scene, and a peripheral light value is determined based on a peripheral area brightness of the scene. After determining by comparison between the central and peripheral light values whether the scene is back-lighted or front-lighted, a correction coefficient specific to back-lighted scenes or that specific to front-lighted scenes is read from a memory. An exposure value suitable for a main subject is calculated according a predetermined equation: $Es = \log_2\{1-(1-\alpha)2^{LVb-LVa}\} - \log_2 \alpha + LVa$, where Es represents the exposure value and .alpha. represents the correction coefficient.

One disadvantage of this approach is that it requires a memory to store the correction coefficient and additional logic to implement the above equation. As can be appreciated, the additional required hardware and/or software complicates the camera design and raises reliability issues. However, a flash could still be required to illuminate a central subject.

Based on the foregoing, there remains a need for an exposure compensation method and system that overcomes the disadvantages of the prior art as set forth; previously.

SUMMARY OF THE INVENTION

According to one embodiment of the present invention, a method for compensating for backlight conditions in a scene for use in an image capture device that includes a flash and a flash control signal for activating the flash when the flash control signal is asserted is described. First, a meter matrix for a scene that includes a plurality of points, where each point can include brightness information and distance information is generated. Second, a flash control signal is selectively asserted based on the meter matrix.

According to another embodiment of the present invention, an image capture device (e.g., a camera) for capturing a scene is described. The image capture device includes a flash for emitting light in response to an asserted flash control signal. The image capture device also includes a meter matrix generator for generating a meter matrix based on information received from the scene. The meter matrix can, for example, include a plurality of points, where each point has distance information and brightness information. The image capture device also includes a backlight compensation unit that is coupled to the meter matrix generator for receiving the meter matrix and for selectively asserting the flash control signal based on the matrix meter.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
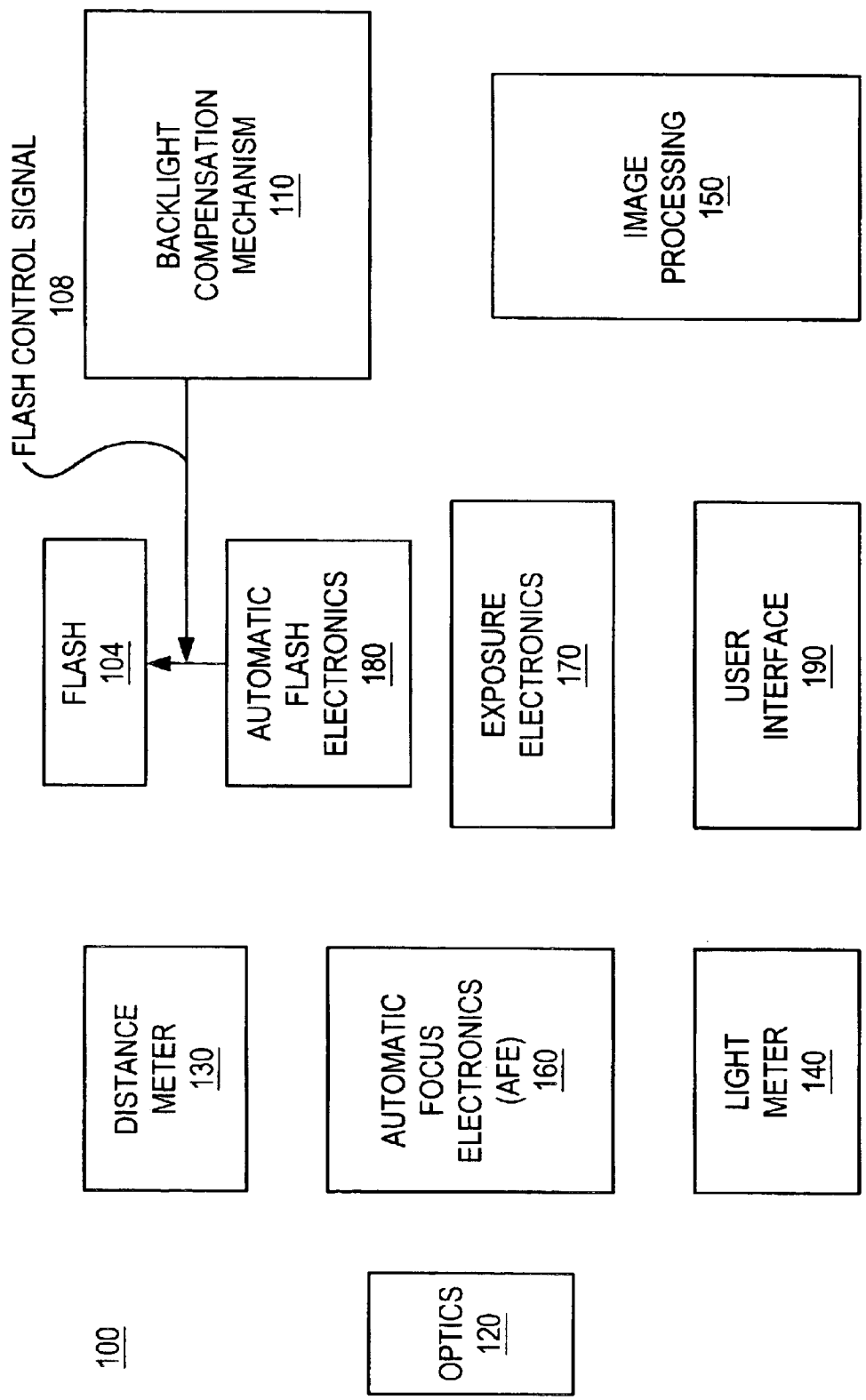
FIG. 1 illustrates a camera in which the backlight compensation mechanism according to one embodiment of the present invention can be implemented.

A method and system for exposure compensation that employs a meter matrix and flash is now described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

It is noted that aspects of the present invention are described in connection with camera. However, it is to be appreciated that the teachings of the present invention extend to other image capture devices that are film-based or film-less (i.e., digital image capture devices).

The exposure compensation system and method according to the invention can be implemented in hardware, software, firmware, or a combination thereof. In one embodiment, the invention is implemented using software that is executed by general purpose or an application specific processor.

In an alternative implementation, embodiments of the invention may be implemented using a combination of hardware and software that is stored in a memory and that is executed by a suitable instruction execution system.

The hardware portion of the invention can be implemented with one or more of the following well-known technologies: discrete logic circuits that include logic gates for implementing logic functions upon data signals, application specific integrated circuit (ASIC), a programmable gate array(s) (PGA), and a field-programmable gate array (FPGA).

The software portion of the invention can be stored in one or more memory elements and executed by a suitable general purpose or application specific processor. The program for exposure compensation, which comprises an ordered listing of executable instructions for implementing logical functions, can be embodied in any computer-readable medium for use by or in connection with an instruction execution system or apparatus (e.g., a computer-based system, a processor-based system, or other system that can fetch and execute the instructions).

As used herein the term "computer-readable medium" can be any means that can contain, store, communicate, propagate, or transport the program for use by or in connection with the instruction execution system or apparatus. The computer readable medium can be, for example, but is not limited to, an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the computer-readable medium can even be paper or another suitable medium upon which the program is printed. The program can be, electronically captured (e.g., through optical scanning) from the paper or medium, compiled, interpreted or otherwise processed in a suitable manner if necessary, and then stored in a computer memory.

Image Capture Device

FIG. 1 illustrates an image capture device (e.g., a camera) 100 in which the backlight compensation mechanism 110 according to one embodiment of the present invention can be implemented. The image capture device includes optics 120, distance meter 130, a light meter 140, image processing electronics 150, automatic focus electronics 160, exposure electronics 170, automatic flash electronics 180, and user interface electronics 190. These components are well known to those of ordinary skill in the art and will not be described herein.

The image capture device 110 can be, but is not limited to, a film camera, a digital camera, an image sensor for machine vision applications, or an image sensor utilized in scientific applications (e.g., remote sensing applications) or manufacturing applications (e.g., assembly line applications).

The image capture device also includes a flash 104 and a flash control signal 108 for activating the flash 104 when the flash control signal 108 is asserted.

The image capture device includes a backlight compensation mechanism, (BCM) 110 for compensating for backlight conditions in a scene. The BCM 110 can receive information and input from the other components in the device capture device 100. For example, the BCM 110 can receive distance information concerning a point; or group of points in a scene from the distance meter 130 and brightness information concerning a point or group of points in a scene from the light meter 140. The; backlight compensation mechanism 110 is described in greater detail hereinafter with reference to FIGS. 2–4.

The BCM 110 can be implemented as a stand-alone mechanism or integrated with one or more of the above-noted components. In one example, the backlight compensation mechanism 110 may be integrated with automatic flash electronics 180. In another example, the backlight compensation mechanism 110 may be integrated with the automatic focus electronics 160 or the automatic exposure electronics 170.

Backlight Compensation Mechanism (BCM) 110

Figure 2:
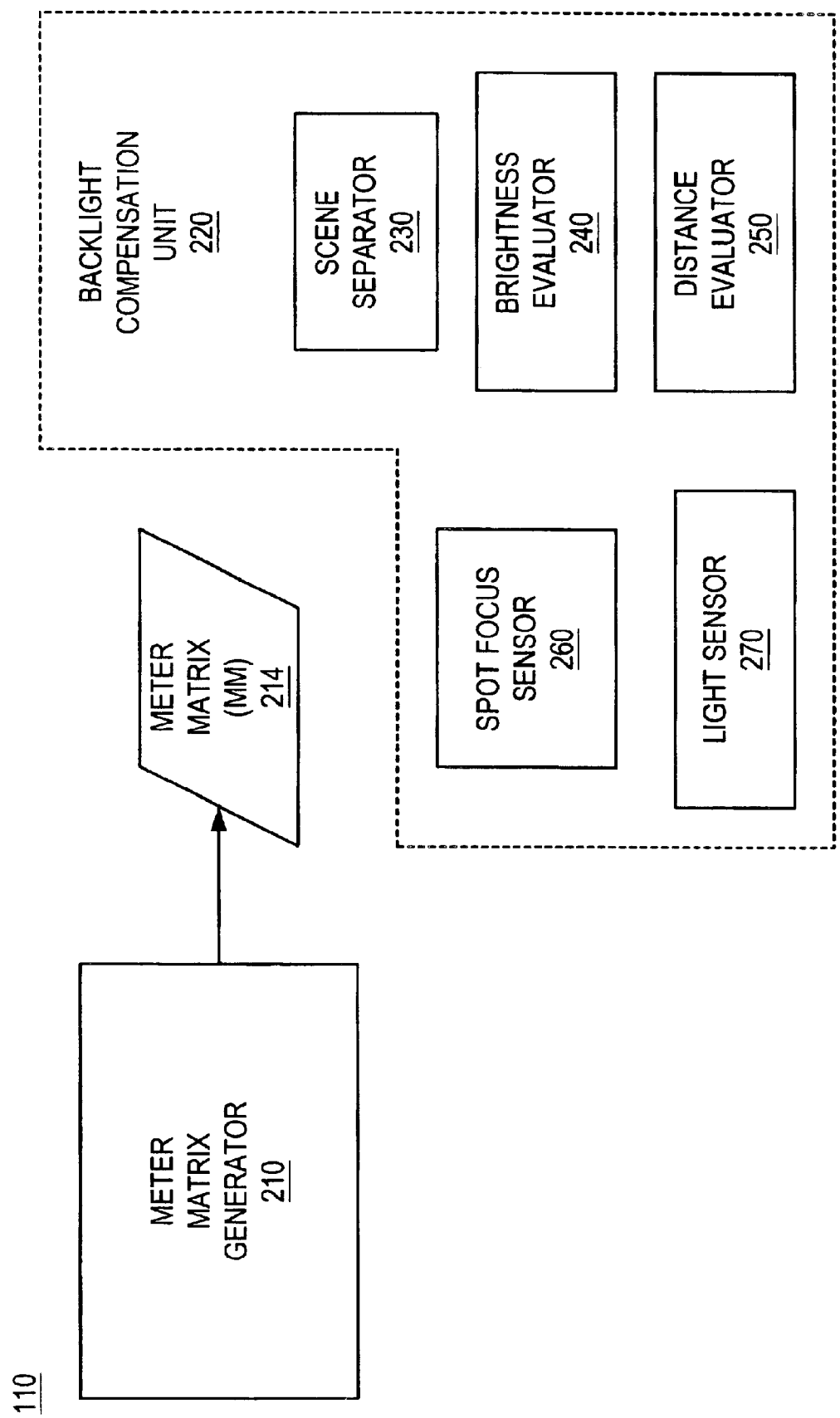
FIG. 2 is a block diagram illustrating in greater detail the backlight compensation mechanism of FIG. 1 in accordance with one embodiment of the present invention.

FIG. 2 is a block diagram illustrating in greater detail the backlight compensation mechanism 110 of FIG. 1 in accordance with one embodiment of the present invention. The backlight compensation mechanism 110 compensates for backlight conditions in a scene by employing a flash and more specifically by asserting a flash control signal for activating the flash.

The backlight compensation mechanism 110 includes a meter matrix generator 210 for generating a meter matrix 214 for a scene based on information received from the scene. The meter matrix 214 includes a plurality of points, where each point includes brightness information and distance information. An exemplary meter matrix 214 is described in greater detail hereinafter with reference to FIG. 5.

The backlight compensation mechanism 110 includes a backlight compensation unit 220 (also referred to herein as a flash controller 220) that is coupled to the meter matrix generator 210 for receiving the meter matrix 214 and for selectively asserting the flash control signal 108 based on the matrix meter 214.

The backlight compensation unit 220 includes a scene separator 230 for separating the plurality of points in a scene into a subject group and a background group. The backlight compensation unit 220 includes a brightness evaluator 240 for selectively asserting the flash control signal based on brightness information of a point in the subject group and a point in the background group. The backlight compensation unit 220 also includes a distance evaluator 250 for selectively asserting the flash control signal based on distance information of a point in the subject group and a point on the background group.

It is noted that the backlight compensation mechanism according to the invention, can utilize distance information alone, brightness information alone, or a; combination thereof, to determine whether to assert the flash control signal 108. Furthermore, the backlight compensation mechanism according to the invention, can employ the 1) distance between the camera and one or more points in the subject, 2) the distance between the camera and one or more points in the background, 3) the brightness of one or more points in the subject, 4) the brightness of one or more points in the background, 5) the general brightness of the scene, or a combination thereof to determine whether to assert the flash control signal 108. Two exemplary embodiments of how one or more of the above factors are utilized to selectively assert the flash control signal 108 are described with reference to FIGS. 3 and 4.

The backlight compensation unit 220 can also include a spot focus sensor 260 for measuring the distance between the camera and the point in the subject group and a general light sensor 270 for measuring the general brightness level of the scene.

Processing Steps—First Embodiment

Figure 3:
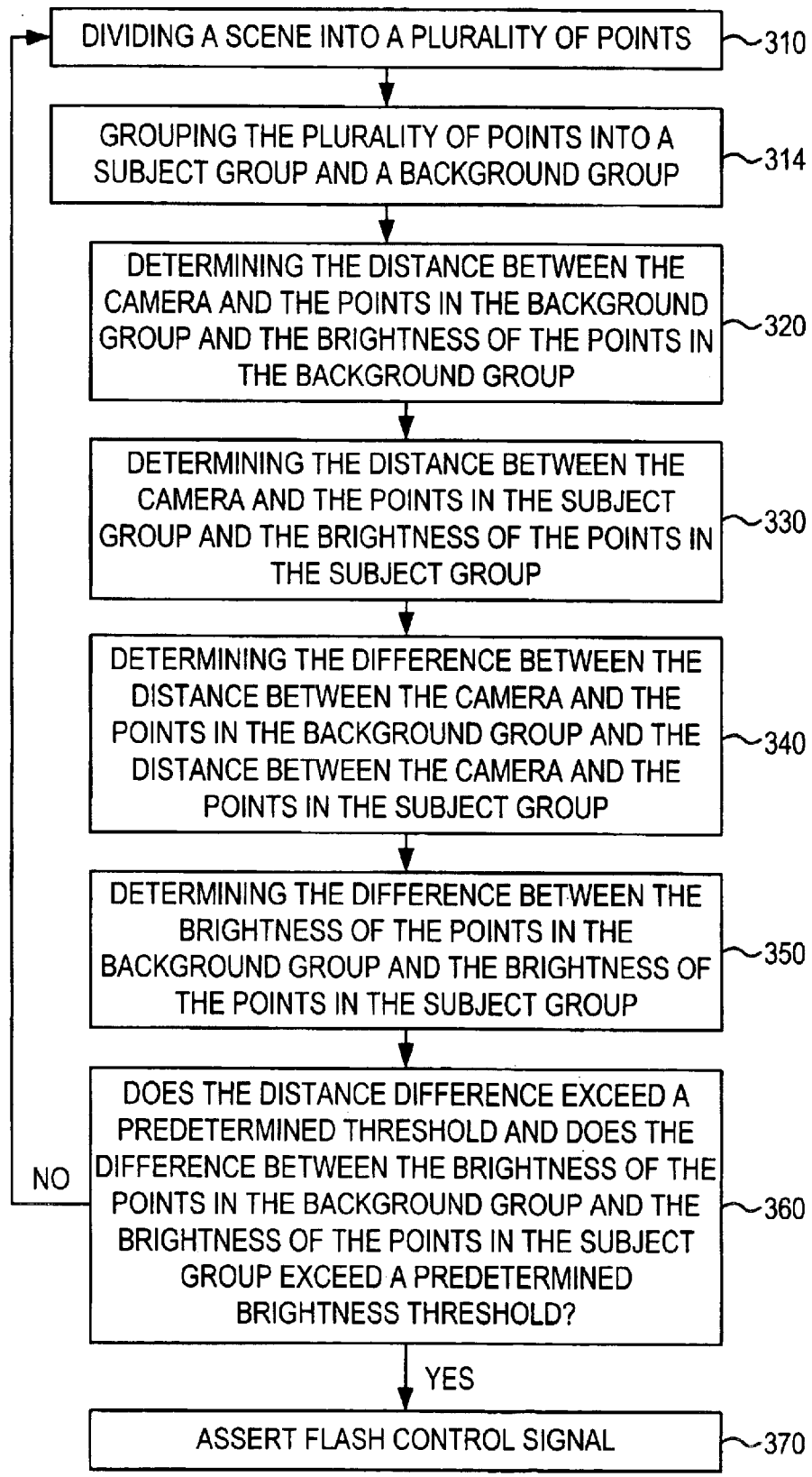
FIG. 3 is a flow chart illustrating the steps performed by the backlight compensation mechanism in accordance with one embodiment of the present invention.

FIG. 3 is a flow chart illustrating the steps performed by the backlight compensation mechanism in accordance with one embodiment of the present invention. First, a meter matrix is generated for a scene. A meter matrix includes a plurality of points, where each point can include brightness information and distance information. The step of generating a meter matrix can include the following sub-steps. In step 310, a scene is divided into a plurality of points. In step 314, the plurality of points is grouped into a subject group and a background group. Exemplary meter matrices are illustrated in greater detail hereinafter with reference to FIGS. 5–8.

Once generated, the meter matrix is employed to selectively assert a flash control signal. The step of employing the meter matrix to selectively assert a flash control signal can include the following sub-steps. In step 320, the distance between the camera and the points in the background group and the brightness of the points in the background group are determined. In step 330, the distance between the camera and the points in the subject group and the brightness of the points in the subject group is determined.

In step 340, the difference between the distance between the camera and the points in the background group and the distance between the camera and the points in the subject group is calculated. In step 350, the difference between the brightness of the points in the background group and the brightness of the points in the subject group is also calculated. In step 360, a determination is made whether the distance difference exceeds a predetermined threshold and whether the difference between the brightness of the points in the background group and the brightness of the points in the subject group exceeds a predetermined brightness threshold. When the distance difference exceeds a predetermined threshold and the difference between the brightness of the points in the background group and the brightness of the points in the subject group exceeds a predetermined brightness threshold, the flash control signal is asserted in step 370. For example, when the background is far away from the image capture device relative to the subject, and the background is relatively bright as compared to the subject, the flash is asserted by the backlight compensation mechanism according to the invention. Otherwise, the flash control signal is not asserted and processing continues at processing-step 310.

Processing Steps—Second Embodiment

Figure 4:
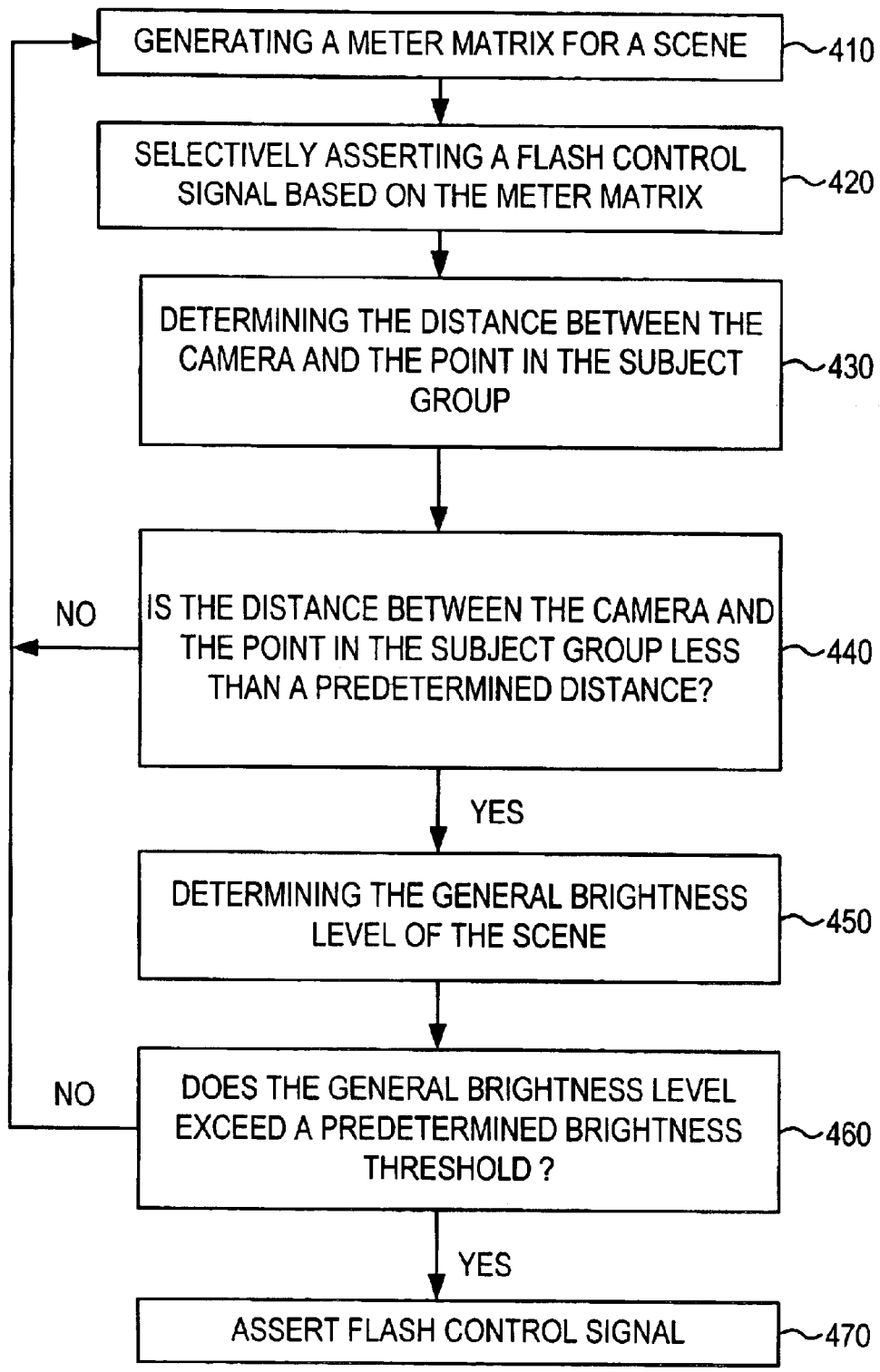
FIG. 4 is a flow chart illustrating the steps performed by the backlight compensation mechanism in accordance with a second embodiment of the present invention.

FIG. 4 is a flow chart illustrating the steps performed by the backlight compensation mechanism in accordance with a second embodiment of the present invention. In step 410, a meter matrix for a scene is generated. The meter matrix includes a plurality of points, where each point includes brightness information and distance information. In step 420, a flash control signal is selectively asserted based on the meter matrix. The step of selectively asserting a flash control signal based on the meter matrix can include the following sub-steps.

In step 430, the distance between the camera and a point (or group of points) in the subject group is determined by the distance meter 130. In step 440, it is determined whether the distance between the camera and the point in the subject group is less than a predetermined distance. When the distance between the camera and the point in the subject group is not less than a predetermined distance, processing proceeds to step 410.

When the distance between the camera and the point in the subject group is less than a predetermined distance, in step 450, a general brightness level of the scene is determined. The general brightness level of the scene can be provided by a light meter 140 of the image capture device and can include the average brightness of all the pixels of a scene or a predetermined group of pixels in a predetermined location (e.g., a group of pixels near the center of the scene). In step 460, it is determined whether the general brightness level exceeds a predetermined brightness threshold.

When the general brightness level exceeds a predetermined brightness threshold, in step 470, a flash control signal is asserted.

Alternatively, a specific brightness level can be employed in steps 450 to 470. In this case, the following steps may be performed. First, the brightness of the points in the background group is determined. Next, the brightness of the points in the subject group is determined. Then, the difference between the brightness of the points in the background group and the brightness of the points in the subject group is calculated. A determination is then made whether the difference between the brightness of the points in the background group and the brightness of the points in the subject group exceed a predetermined brightness threshold. When the difference exceeds the predetermined threshold, the flash signal is asserted.

In another embodiment, steps 450 through 470 may be performed without performing steps 430 and 440. In this embodiment, the distance is not utilized, and the selective assertion of the flash control signal depends on the general brightness level of the scene. It is noted that the step of selectively asserting a flash control signal may be based on distance information, brightness information (e.g., general brightness or specific brightness differences between points in the subject and points in the background), or a combination thereof.

Exemplary Meter Matrix

Figure 5:
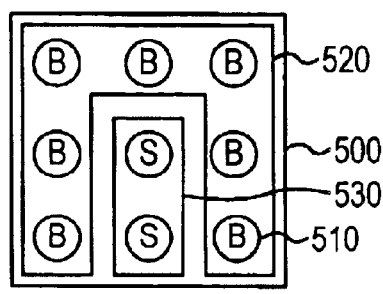
FIG. 5 illustrates an exemplary meter matrix that may be utilized by the present invention.

FIG. 5 illustrates an exemplary meter matrix 500 that may be utilized by the present invention. The matrix 500 includes a plurality of points 510 that are grouped into background points 520 that are denoted by "B" and subject points 530 that are denoted by "S". The background points 520 are also referred to herein as points in perimeter points. It is noted that the number of points, the patterns for the points in the subject, the pattern for the points in the perimeter or background according to the invention may be modified and adjusted to suit a particular application. In the current example, the points in the background form an upside down "U" and the points in the subject form an "I" shape. However, it is noted that the points in the background or perimeter and the points in the subject may be in the form of other continuous or discontinuous shapes and patterns. Additional non-limiting examples of different meter matrices that may be employed by the backlight compensation mechanism according to the invention are described herein below.

Figure 6:
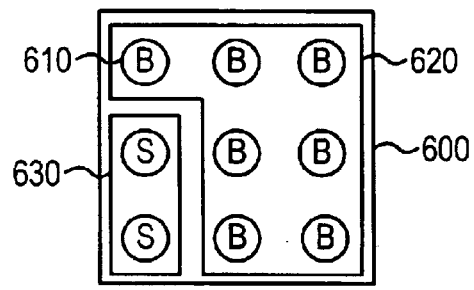
FIG. 6 illustrates another exemplary meter matrix that may be utilized by the present invention.

FIG. 6 illustrates another exemplary meter matrix 600 that may be utilized by the present invention. The matrix 600 includes a plurality of points 610 that are grouped into background points 620 (also referred to herein as "perimeter" points) that are denoted by "B" and subject points 630 that are denoted by "S". This meter matrix 600 is especially suitable for subjects that are near or disposed along the left border of a scene. It is noted that the number of points, the pattern of the points in the subject, the pattern of the points in the perimeter or background according to the invention may be modified and adjusted to suit a particular application.

Figure 7:
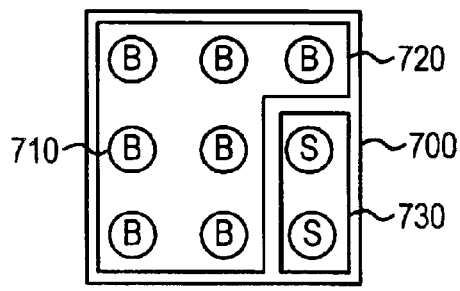
FIG. 7 illustrates yet another exemplary meter matrix that may be utilized by the present invention.

FIG. 7 illustrates yet another exemplary meter matrix 700 that may be utilized by the present invention. The matrix 700 includes a plurality of points 710 that are grouped into background points 720 (also referred to herein as "perimeter" points) that are denoted by "B" and subject points 730 that are denoted by "S". This meter matrix 700 is especially suitable for subjects that are near or disposed along the right border of the scene. It is noted that the number of points, the pattern of the points in the subject, the pattern of the points in the perimeter or background according to the invention may be modified and adjusted to suit a particular application.

Figure 8:
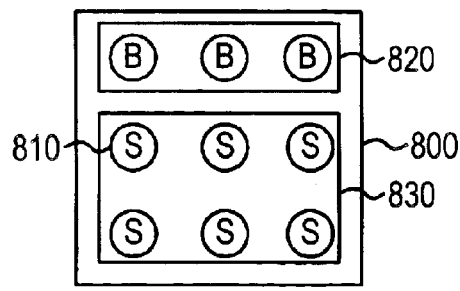
FIG. 8 illustrates another exemplary meter matrix that may be utilized by the present invention.

FIG. 8 illustrates another exemplary meter matrix 800 that may be utilized by the present invention. The matrix 800 includes a plurality of points 810 that are grouped into background points 820 (also referred to herein as "perimeter" points) that are denoted by "B" and subject points 830 that are denoted by "S". This meter matrix 800 is especially suitable for subjects that are disposed near the bottom portion of the scene. It is noted that the number of points, the pattern of the points in the subject, the pattern of the points in the perimeter or background according to the invention may be modified and adjusted to suit a particular application.

For example, a meter matrix that includes two rows of subject points and a third row of background points would be suitable for subjects that are disposed near the top portion of a scene.

It is noted that each region of a scene is denoted by a single circle or point with a label of either "B" or "S". However, the single circle or point can represent a, plurality of points that represent either the subject or the background. The plurality of points can also form other shapes besides the circular shape shown. For example, shapes with straight edges or non-straight edges can be employed in the meter matrix.

A scene with backlight conditions would benefit from the backlight compensation mechanism according to the invention. For example, a scene with backlight conditions typically includes a plurality of points, which are arranged into background or perimeter points and subject points, where the points in the perimeter are far from the capture device relative to the points in the subject and are lighter in terms of brightness than the points in the subject. In contrast, the points in the subject are darker in brightness and nearer to the image capture device than the points in the perimeter.

An example of a scene with backlight conditions is a scene where there is a light source in the background (e.g., street lamp or other natural or artificial light source). When captured, such a scene with backlight conditions would result in a poor quality picture with an undesirable bright background and a dark subject. By automatically detecting the backlight condition and asserting the flash, the exposure compensation mechanism of the invention detects the backlight conditions and enables the flash (e.g., in accordance to FIG. 4), thereby causing the captured picture to have a desirable exposure (e.g., a bright subject).

A scene with slow synchronization conditions would benefit from the backlight compensation mechanism according to the invention. For example, a scene with slow synchronization conditions typically includes a plurality of points that are grouped into background or perimeter points and subject points that are denoted by "S". The points in the perimeter are far from the image capture device relative to the points in the subject and are darker in terms of brightness than the points in the subject. In this case, the points in the subject are also dark in terms of brightness, but nearer to the image capture device than the points in the perimeter. Without the exposure compensation mechanism of the invention, a scene with slow synchronization conditions results in a photograph with a poor quality picture that features an over-exposed subject and an under-exposed background.

Sometimes, pictures taken with a flash exhibit a well-exposed foreground subject against a black or very dark background, thereby providing an un-desired effect. The exposure compensation mechanism according to the invention provides a slow synchronized mode that minimizes this problem by leaving the shutter open longer than usual to lighten the background.

For example, in one embodiment, the exposure compensation mechanism employs a slow shutter speed in the slow synchronized mode allows blur from rapidly moving objects or camera shake to appear as blur in the images. To avoid blur, one may use a tripod or simply photograph static subjects (e.g., non-moving subjects).

The exposure compensation mechanism according to the invention may be employed to create special effects in the photograph. For example, a short flash burst combined with a long shutter speed provides interesting special effects. The short flash burst freezes objects sharply, and then the dim ambient light slightly blurs the image, thereby making moving lights appear as streaks in the photograph.

By automatically detecting the slow synchronization condition and asserting the flash and adjusting the exposure, the exposure compensation mechanism of the invention causes the captured picture to have a desirable exposure.

The exposure compensation mechanism according to the invention detects a well-exposed foreground against a dark background and selectively controls the flash and shutter timing to compensate for this situation. For example, once a slow-sync situation has been detected, the exposure compensation mechanism according to the invention can trigger the flash to expose the subject and set a longer exposure time in order to expose the background.

The principles of the present invention are described in the context of an image capture device (e.g., a film-based or film-less camera). However, it is noted that the teaching of the present invention can be applied to other sensors and other applications, such as, image sensors utilized in machine vision applications.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for compensating for backlight conditions in a scene for use in a camera that includes a flash and a flash control signal for activating the flash when the flash control signal is asserted, the method comprising the steps of:
   generating a meter matrix for a scene that includes a plurality of points, wherein each point includes brightness information and distance information said generating comprising:
      defining a subject group of points;
      defining a background group of points;
      generating at least one point in the subject group;
      generating at least one point in the background group; and
   determining the distance between the camera and the point in the subject group;
   determining whether the distance between the camera and the point in the subject group is less than a predetermined distance;
   when the distance between the camera and the point in the subject group is less than a predetermined distance;
   determining a general brightness level of the scene;
   determining whether the general brightness level exceeds a predetermined brightness threshold; and
   when the general brightness level exceeds a predetermined brightness threshold, asserting the flash control signal.

2. The method of claim 1 and further comprising:
   determining the distance between the camera and the point in the background group; and
   determining the difference between the distance between the camera and the point in the background group and the distance between the camera and the point in the subject group.

3. The method of claim 2 and further comprising:
   determining the brightness of the point in the subject group;
   determining the brightness of the point in the background group; and
   determining the difference between the brightness of the point in the background group and the brightness in the subject group.

4. The method of claim 3 and further comprising:
   determining whether the distance difference exceeds a predetermined distance threshold;
   determining whether the brightness difference exceeds a predetermined brightness threshold; and
   when the distance difference exceeds a predetermined distance threshold and when the brightness difference exceeds a predetermined brightness threshold, asserting the flash control signal.

5. The method of claim 1 wherein the background points form an inverted "U" shape and the subject group of points form an "I" shape.

6. The method of claim 1 wherein the step of determining the distance between the camera and the point in the subject group includes
   employing a spot focus sensor for measuring the distance between the camera ad the point in the subject group.

7. The method of claim 1 wherein the step of determining a general brightness level of the scene includes employing a general light sensor for measuring the general brightness level of the scene.

8. The method of claim 1 wherein the camera is one of a digital camera, a film camera, an image sensor.

9. A camera for capturing a scene, said camera comprising:
   flash for emitting light in response to an asserted flash control signal;
   a scene separator for separating the plurality of point in a scene into a subject group and a background group;
   a meter matrix generator for generating a meter matrix based on information received from the scene; wherein the meter matrix includes a plurality of points; wherein each point includes distance information and brightness information;
   a brightness evaluator for selectively asserting the flash control signal based on brightness information of a point in the subject group and a point in the background group; and
   a distance evaluator for selectively asserting the flash control signal based on distance information of a point in the subject group and a point in the background group.

10. The camera of claim 9 wherein the distance evaluator determines the distance between the camera and the point in the subject group, determines the distance between the camera and the point in the background group, and determines the difference between the distance between the camera and the point in the background group and the distance between the camera and the point in the subject group.

11. The camera of claim 10 and further comprising a brightness compensation unit, wherein the brightness evaluator determines the brightness of the point in the subject group, determines the brightness of the point in the background group, and determines the difference between the brightness of the point in the background group and the brightness of the point in the subject group;
   wherein the backlight compensation unit determines whether the distance difference exceeds a predetermined distance threshold and determines whether the brightness difference exceeds a predetermined brightness threshold, and when the distance difference exceeds a predetermined distance threshold and when the brightness difference exceeds a predetermined brightness threshold, asserting the flash control signal.

12. The camera of claim 9 wherein the distance evaluator determines the distance between the camera and the point in the subject group, determines whether the distance between the camera and the point in the subject group is less than a predetermined distance, when the distance between the camera and the point in the subject group is less than a predetermined distance, employing the brightness evaluator to determine a general brightness level of the scene, determine whether the general brightness level exceeds a predetermined brightness threshold, and when the general brightness level exceeds a predetermined brightness threshold, asserting the flash control signal.

13. The camera of claim 12 further comprising:
a spot focus sensor for measuring the distance between the camera and the point in the subject group; and
a general light sensor for measuring the general brightness level of the scene.

14. The camera of claim 9 further comprising:
means for measuring distance information of the scene; and
means for measuring brightness information of the scene.

15. The camera of claim 9 wherein the camera is one of a digital camera and a film camera.

16. A camera for capturing a scene, said camera comprising:
means for emitting light in response to an asserted flash control signal;
means for generating a meter matrix based on information received from the scene; wherein the meter matrix includes a plurality of points; wherein each point includes distance information and brightness information; and
backlight compensation means coupled to the meter matrix generator for receiving the meter matrix and for selectively asserting the flash control signal based on the matrix meter, the backlight compensation means further comprising:
means for separating the plurality of points in a scene into a subject group and a background group;
brightness evaluating means for selectively asserting the flesh control signal based on brightness information of a point in the subject group and a point in the background group; and
distance evaluation means for selectively asserting the flash control signal based on distance information of a point in the subject group and a point in the background group.

* * * * *

UNITED STATES PATENT AND TRADEMARK OFFICE
CERTIFICATE OF CORRECTION

PATENT NO. : 6,859,618 B1
APPLICATION NO. : 10/714301
DATED : February 22, 2005
INVENTOR(S) : Yip It is certified that error appears in the above-identified patent and that said Letters Patent is hereby corrected as shown below:

In the Claims

Col. 10 (line 5), delete "ad" and insert therefor --and--.

Col. 10 (line 15), before the first use of "flash", insert --a--.

Col. 12 (line 10), delete "flesh" and insert therefor --flash--.

Signed and Sealed this

Tenth Day of June, 2008

JON W. DUDAS
*Director of the United States Patent and Trademark Office*